United States Patent Office 2,755,977
Patented July 24, 1956

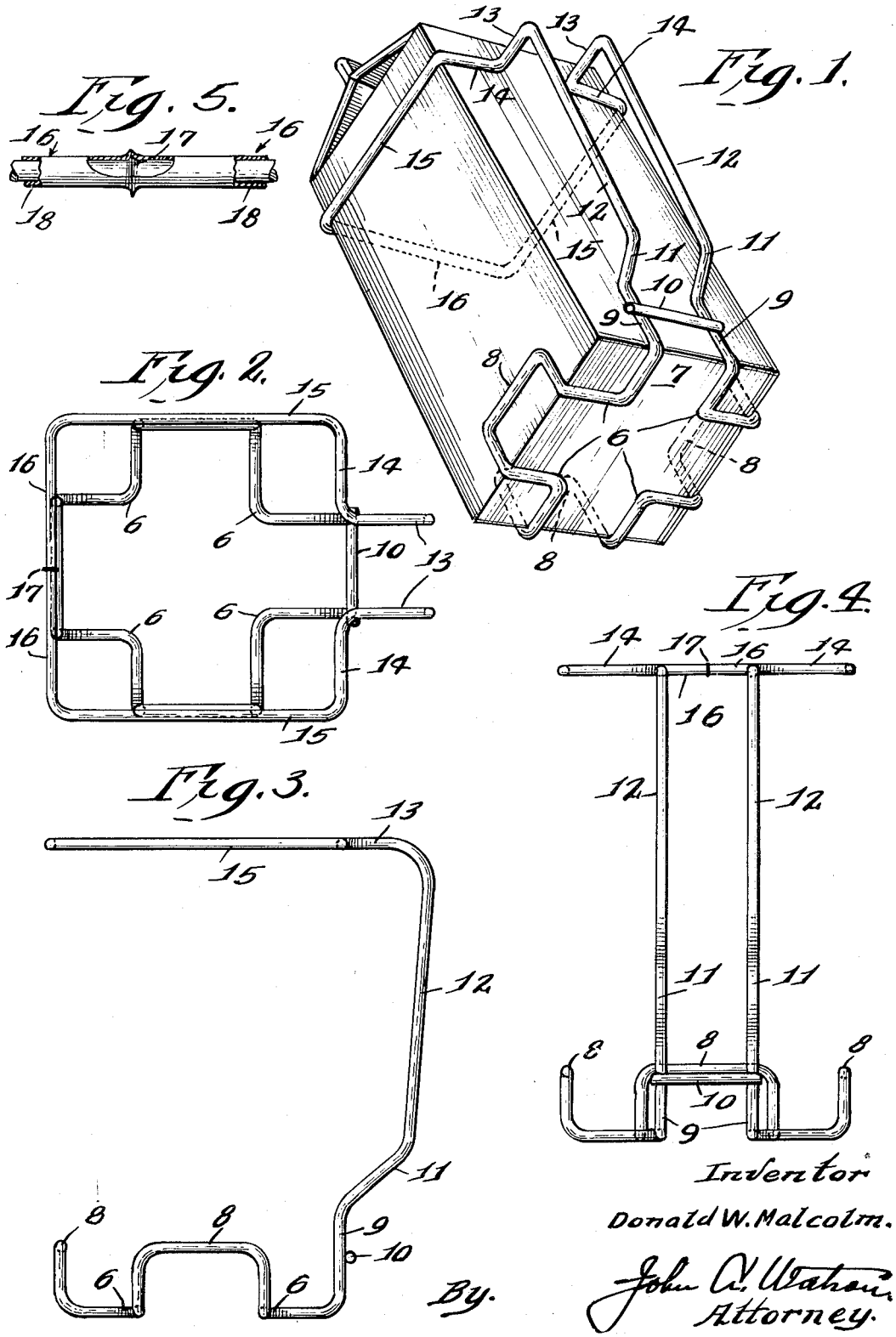

2,755,977

WIRE HOLDER FOR FIBER MILK BOTTLES

Donald W. Malcolm, Hollywood, Ill., assignor to Latex Laboratories, Inc., Chicago, Ill., a corporation of Illinois Application March 28, 1952, Serial No. 279,028

2 Claims. (Cl. 224—45)

The invention pertains to holders made of wire to be used primarily for supporting and gripping containers such as milk and cream bottles and the like made of waxed or otherwise treated paperboard or like fibrous material, which are difficult to handle and hold especially in the larger sizes. More particularly the invention relates to holders of such nature and construction that the bottle or container may be disposed in the holder and kept therein until the container has been emptied of its contents, the assembled container and holder being placed as a single unit in a refrigerator or other place of storage until the container is to be discarded at which time the holder is available for reception of the next container.

Paperboard containers for milk, cream and other liquids with wax impregnation or coating, are very difficult to handle. Housewives especially find such containers hard to handle because of the waxed surfaces and awkwardness of shape which does not well fit the hand. Such impediments to ease of use frequently engender sales resistance to acceptance of milk and other liquids in that type of package or container. The problems encountered are greatly increased with increase in the size of the container for while a pint size may be grasped by the hand of a housewife, a paperboard container of one half gallon capacity, for instance, when filled with whole milk will weigh approximately 4¾ lbs., a very substantial weight to support by the grip of a woman's hand stretched across a span of 3½ to 4 inches the approximate width of one side wall of a container of one-half gallon capacity. The difficulties are accentuated when the container of large size is tipped to pour out the contents for, unless an unusually good, firm grip is had and such grip is at or very close to a place of balance between the container ends, the container may over or under balance and cause the user to drop the container or spill its contents.

The principal objects of the invention include the provision of a simple and inexpensive holder which may be composed of a single piece or length of wire in all of its major parts and their functions, which may support at all times a container or carton of the type mentioned whether the container is being carried by hand or disposed on a table or in a refrigerator, which will enable the user to grip the container firmly, conveniently and securely without causing leakage or spillage of contents whether while using the holder to carry the container or while pouring the contents therefrom, which is sturdy and strong although light in weight, which will be sanitary and easily cleaned or sterilized, and which will have a neat and attractive appearance.

Many other objects as well as the advantages and uses of the invention will be apparent upon reading the following description and claims and after viewing the accompanying drawings in which:

Fig. 1 is a perspective view of a presently preferred form of the holder as the same appears with a paperboard milk or other liquid container disposed therein, the view being from the rear or handle side and bottom with the container and holder tipped away from the observer in a position for pouring from the container;

Fig. 2 is a bottom plan view of the holder of Fig. 1;

Fig. 3 is a view in side elevation of the holder of Fig. 1;

Fig. 4 is a view in rear elevation of the holder of Fig. 1; and

Fig. 5 is an enlarged view of a fragment of the wire holder showing a butt-weld joint for the wire ends and a resilient protective covering or coating on the wire.

The holder of the invention may be made from a single length of suitable steel or other wire the two ends of which may be secured together by butt-welding or otherwise either before or after forming, but in the illustrated embodiment a second piece of wire is employed for purposes later appearing. The wire is so formed as to provide base or supporting portions 6 each of which, in the instant embodiment, is composed of two parts extending substantially at right angles to one another in one plane which is a plane common to all and parallel to the flat bottom 7 of the container. As will be noted from the drawings, each of the base portions 6 engages the container bottom wall at and across a corner thereof and between each of those portions, except at the rear of the container, has a U-shaped portion 8 lying in a plane substantially perpendicular to the plane of the base portions and substantially parallel to the plane of that side wall of the container to which it is to extend closely adjacent. When the container has three sides, or four sides like that illustrated, it is preferable that there be a loop or U-shaped portion 8 or its equivalent adjacent to each container side wall but if the container has more than four sides it will usually be unnecessary to have one for each side as will be appreciated. The portions 8 at three sides and an equivalent portion at the rear of the container (with reference to the container pouring spout or lip) serve to position and retain the container with respect to the base and other parts of the holder.

At the rear side the wire is bent upwardly as at 9 from each of the adjacent parts of adjacent base portions 6 to extend perpendicular to the plane of the base and to lie closely adjacent to the rear side wall of the container for approximately the same vertical distance as the height of portions 8 at which point or level the two parts of the wire may be secured in their parallel spaced relation by a connecting piece of wire 10 welded or otherwise secured to the parts 9. From the upper end of each part 9 the wire extends outwardly and upwardly, relative to the rear side wall of the container, first for a short length 11 at an abrupt angle and then over a much greater length 12 at a slight angle, thereby to provide parallel handle or hand grip portions adjacent to the container rear side wall. Each of the parts 12 of the handle portions terminates in a part 13 extending toward the container rear side wall substantially parallel to the other part 13 and, preferably, parallel to the plane of the base portion.

Extending in opposite directions from and substantially at right angles to each part 13 and preferably in a plane common to both parts 13 and parallel to the plane of the base, parts 14 of the wire are disposed close to but at a slight spacing from the upper part of the container rear side wall. Extending at right angles to parts 14 and lying in the same plane therewith and with parts 13 are parallel parts 15 which extend across each of the opposite lateral side walls of the container and are joined at right angles with parts 16 which together extend across the front side wall of the container. As the parts 16 form the terminal ends of the length of wire they are butt-welded together as indicated at 17. Preferably the lengths of the parts 14, 15 and 16 together providing a portion for clamping the upper part of the container, are such as to position them closely adjacent to the side walls of the container to be disposed between them but with sufficient space left between these parts and the container side walls as to permit a container easily to be inserted and withdrawn from between the loop thus formed when the handle portions are not being gripped.

After the wire has been formed to provide the several essential portions of the holder, namely, the base or support portion represented by the parts 6, the container positioning and retaining portions represented by the parts 8, the handle or hand-grip portion represented by the parts 11, 12 and 13, and the clamping portion represented by the parts 14, 15 and 16, it is desirable to plate or coat the holder with a rust or corrosion resistant cover 18. Preferably the wire is dipped, sprayed or otherwise coated with a resilient and impervious material such as rubber or plastic which may be washed or otherwise sterilized.

In using a holder of the type and construction disclosed it is a simple matter to dispose the holder upright upon its base on a solid plane surface and, using two hands if necessary, to place a container therein by entering the bottom end of the container in the loop of the clamping portion and guiding it to rest upon the base portion within the embrace of the positioning and retaining parts 8. Of course, the pouring spout or lip side of the container should be located opposite to the handle or hand grips so that pouring may be effected directly away from the hand gripping the holder. As thus assembled both holder and container may be stood upright in a refrigerator or other place until ready to pour the contents from the container. To effect such pouring the user grasps the handle (parts 12) in the hand, the mere act of such grasp normally serving to move the parts 12 and, consequently parts 13, 14 and 15 toward one another, respectively, to clamp or grip the container. The user than lifts and tilts or tips the holder and container to a position such as that shown in Fig. 1. The tighter the hand grips the handle parts 12, the tighter the container is clamped. The piece of wire or stay 10 not only prevents the retaining and base portions from being distorted by movements of the handle parts toward and from one another but also provides a fulcrum point so that the maximum leverage effective by gripping the handle parts is exerted at their upper ends to effect clamping. Properly constructed it is possible so firmly to grip or clamp a paper board carton of the type ordinarily employed for milk, that the side walls and corners between the side walls may be slightly grooved or dented. Parts 14 as well as 15 will engage the adjacent walls of the container and clamp the same firmly.

It will be appreciated that the holder may be modified or varied in many particulars and to suit or fit other types or forms and shapes of container without departing from the invention spirit and the scope of the appended claims.

I claim:

1. A holder for paperboard and similar containers for liquids comprising, a length of wire formed to provide spaced base portions adapted to extend beneath the bottom wall of a container at the rear thereof for supporting the container upon a plane surface, a pair of side portions one of which includes a part extending upward and forward from one and the other of which includes a part which extends upward and forward from the other of the spaced base portions for laterally positioning the opposite sides of a container adjacent to its bottom, a front portion joining the forward ends of the said side portions and including a part extending above the level of the base portions for positioning a container at its front wall at a place above but adjacent to the bottom wall thereof, a pair of rear portions one of which extends upward from one and the other upward from the other of the said spaced base portions at the rear thereof for positioning a container at its rear wall adjacent to the bottom wall thereof, said rear portions being rigidly secured against movement toward and from one another at a place above but adjacent to the level of said spaced base portions, a container clamping portion spaced above said base and side and front portions and including parts adapted to extend across and to embrace the front and to engage each of the opposite side walls of a container, said clamping portion also including parts extending transversely of side margins of the rear wall of a container, and a pair of hand grip portions one of which extends upward from one and the other upward from the other of said rear portions into connection with the clamping portion, said hand grip portions being spaced from one another throughout their lengths and one being connected with one and the other with the other of said clamping portion parts which extend transversely of the carton rear wall margins, said hand grip portions being relatively freely movable toward one another at their upper ends when gripped whereby to move said clamping portion side wall engaging parts into clamping engagement with the opposite side walls of a container.

2. A holder for paperboard and similar containers for liquids, comprising, a length of wire formed to provide spaced base portions adapted to extend beneath the bottom wall of a container for supporting the container upon a plane surface, a pair of side portions one of which includes a part extending upward and forward from one and the other of which includes a part which extends upward and forward from the other of the spaced base portions for laterally positioning the opposite sides of a container adjacent to its bottom, a front portion joining the forward ends of the said side portions and including a part extending above the level of the base portions for positioning a container at its front wall at a place above but adjacent to the bottom wall thereof, a pair of rear portions one of which extends upward from one and the other upward from the other of the said spaced base portions at the rear thereof for positioning a container at its rear wall adjacent to the bottom wall thereof, a container clamping portion spaced above said base and side and front portions and including side parts adapted to extend across and to engage each of the opposite side walls of a container, said clamping portion also including back parts extending transversely of side margins of the rear wall of a container, a pair of hand grip portions one of which extends upward from one and the other upward from the other of said rear portions into connection with the clamping portion, said hand grip portions being spaced from one another throughout their lengths and one being connected with one and the other with the other of said clamping portion parts which extend transversely of the carton rear wall margins, said hand grip portions being relatively freely movable toward one another at their upper ends when gripped whereby to move said clamping portion side wall engaging parts into clamping engagement with the opposite side walls of a container, and means rigidly connecting and spacing the lower ends of the hand grip portion to serve as a fulcrum about which the upper parts of such portions may swing in movements toward one another to cause said clamping portion side parts to engage and clamp against the container side walls.

References Cited in the file of this patent

UNITED STATES PATENTS

| | | |
|---|---|---|
| 419,560 | Rice | Jan. 14, 1890 |
| 679,742 | Goddard | Aug. 6, 1901 |
| 712,355 | Blossom | Oct. 28, 1902 |
| 1,038,116 | Grabler | Sept. 10, 1912 |
| 1,377,350 | Hoskin | May 10, 1921 |
| 1,584,857 | Hobbs | May 18, 1926 |
| 1,720,517 | Joire | July 9, 1929 |
| 2,193,366 | Hardwick | Mar. 12, 1940 |
| 2,305,628 | McKay | Dec. 22, 1942 |